(12) United States Patent
Jeon et al.

(10) Patent No.: US 8,532,187 B2
(45) Date of Patent: Sep. 10, 2013

(54) METHOD AND APPARATUS FOR SCALABLY ENCODING/DECODING VIDEO SIGNAL

(75) Inventors: Byeong Moon Jeon, Seoul (KR); Seung Wook Park, Seoul (KR); Ji Ho Park, Seoul (KR)

(73) Assignee: LG Electronics Inc., Seoul (KR)

( * ) Notice: Subject to any disclaimer, the term of this patent is extended or adjusted under 35 U.S.C. 154(b) by 1296 days.

(21) Appl. No.: 11/918,210

(22) PCT Filed: Feb. 1, 2006

(86) PCT No.: PCT/KR2006/000359
§ 371 (c)(1),
(2), (4) Date: Dec. 22, 2008

(87) PCT Pub. No.: WO2006/083113
PCT Pub. Date: Aug. 10, 2006

(65) Prior Publication Data
US 2009/0168880 A1    Jul. 2, 2009

Related U.S. Application Data

(60) Provisional application No. 60/648,420, filed on Feb. 1, 2005.

(30) Foreign Application Priority Data

Jun. 15, 2005  (KR) .................. 10-2005-0051371

(51) Int. Cl.
*H04N 7/12* (2006.01)
*H04N 7/167* (2011.01)

(52) U.S. Cl.
USPC ............ 375/240.16; 375/240.12; 375/240.17; 375/240.22; 375/240.25; 375/240.26; 380/200; 380/217

(58) Field of Classification Search
USPC ...................... 375/240.16; 380/200
See application file for complete search history.

(56) References Cited

U.S. PATENT DOCUMENTS

| 6,226,326 | B1 | 5/2001 | Mihara |  |
| 2001/0021272 | A1* | 9/2001 | Yamori et al. | 382/236 |

(Continued)

FOREIGN PATENT DOCUMENTS

| WO | 00/64167 | 10/2000 |
| WO | WO 00/64167 | 10/2000 |

(Continued)

OTHER PUBLICATIONS

PCT International Search Report for corresponding Application No. PCT/KR2006/000359 dated Apr. 27, 2006.

(Continued)

*Primary Examiner* — Edan Orgad
*Assistant Examiner* — Jenise Jackson
(74) *Attorney, Agent, or Firm* — Harness, Dickey & Pierce, P.L.C.

(57) ABSTRACT

The present invention relates to a method that uses a motion vector of a predictive video frame of a sub-layer to encode a video signal and decode encoded video data. The method encodes a video signal using a preset method to a bit stream of a base layer while encoding the video signal using a scalable MCTF method to a bit stream of an enhanced layer. When an arbitrary frame of the video signal is encoded, information, enabling at least one vector, derived from a first motion vector of a first block included in the bit stream of the base layer in the same direction as the first motion vector, to be used as a motion vector of an image block in the arbitrary frame, is recorded in the bit stream of the enhanced layer. The first motion vector is directed in the same direction as a temporal direction from the arbitrary frame to the first block.

13 Claims, 12 Drawing Sheets

(56) References Cited

U.S. PATENT DOCUMENTS

| | | | |
|---|---|---|---|
| 2002/0075956 A1* | 6/2002 | Haskell et al. | 375/240.12 |
| 2005/0074059 A1* | 4/2005 | De Bruijn et al. | 375/240 |
| 2006/0008038 A1* | 1/2006 | Song et al. | 375/350 |
| 2006/0088222 A1* | 4/2006 | Han et al. | 382/232 |
| 2006/0114993 A1* | 6/2006 | Xiong et al. | 375/240.11 |
| 2006/0120448 A1* | 6/2006 | Han et al. | 375/240.2 |
| 2006/0153300 A1* | 7/2006 | Wang et al. | 375/240.16 |
| 2006/0159173 A1* | 7/2006 | Ye et al. | 375/240.16 |
| 2006/0165304 A1* | 7/2006 | Lee et al. | 382/240 |
| 2007/0014359 A1* | 1/2007 | Gomila et al. | 375/240.16 |
| 2008/0042953 A1* | 2/2008 | De Haan et al. | 345/89 |
| 2009/0213932 A1* | 8/2009 | Haskell et al. | 375/240.15 |

FOREIGN PATENT DOCUMENTS

| | | |
|---|---|---|
| WO | 01/03441 | 1/2001 |
| WO | WO 01/03441 | 1/2001 |
| WO | WO 2007/081160 | 7/2007 |

OTHER PUBLICATIONS

European Search Report for corresponding Application No. 06715812.1 dated May 7, 2010.

Byeong-Moon Jeon et al: "Inter-layer prediction of temporally enhanced pictures" JVT of ISO/IEC MPEG&ITU-T VCEG(ISO/IEC JTC1/SC29/WG11 and ITU-T SG16 Q6), No. M11625, Jan. 12, 2005, XP030040370.

Kyo-Hyuk Lee et al: "Virtual based-layer motion for scalable video coding" JVT of ISO/IEC MPEG&ITU-T VCEG(ISO/IEC JTC1/SC29/WG11 and ITU-T SG16 Q6), XX, XX, No. M11595, Jan. 11, 2005, XP030040340.

"Description of Core Experiments for Scalable Video Coding (SVC)" JVT of ISO/IEC MPEG&ITU-T VCEG(ISO/IEC JTC1/SC29/WG11 and ITU-T SG16 Q6), XX, XX, No. N6898, Jan. 21, 2005, XP030013618.

* cited by examiner

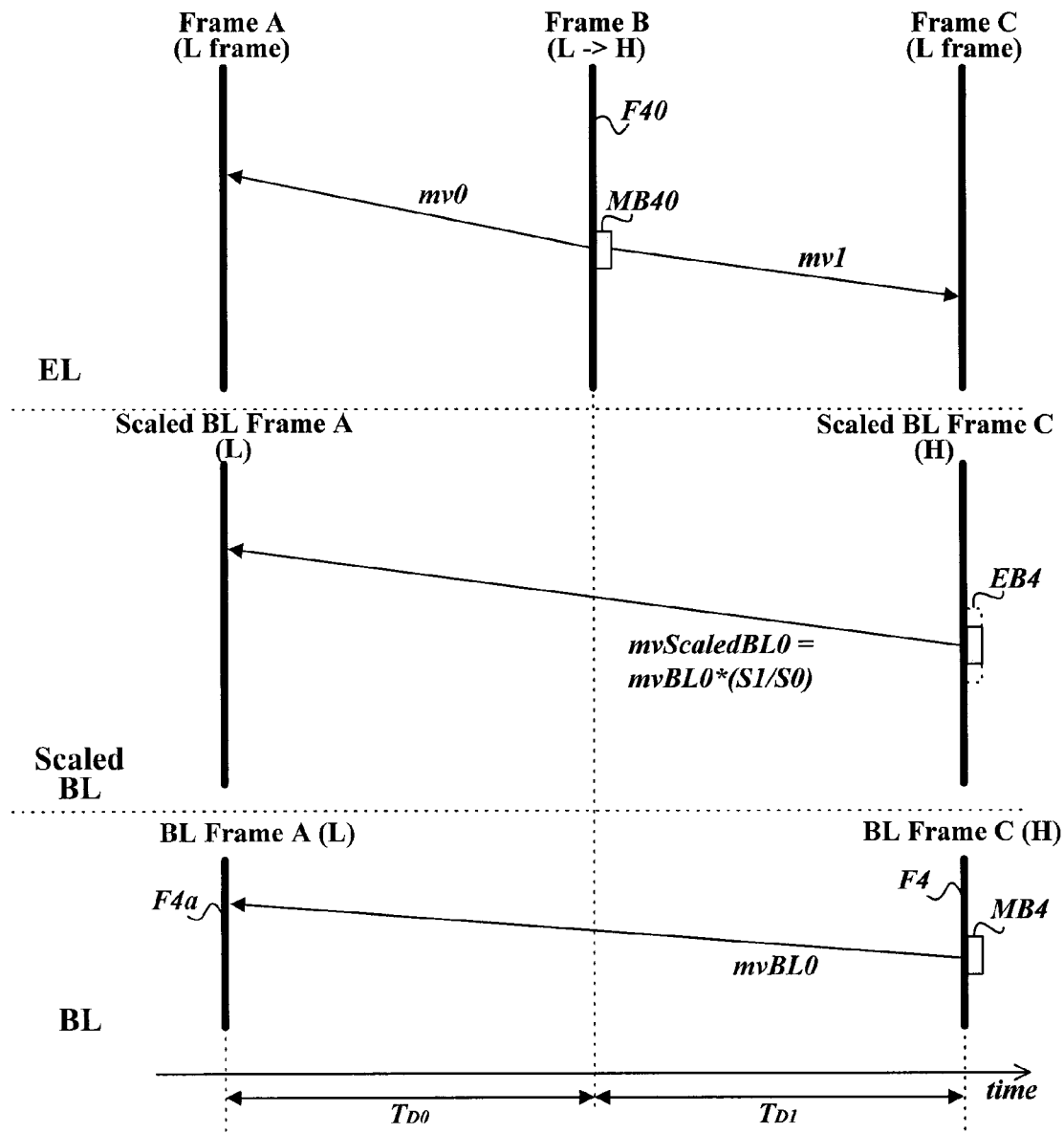

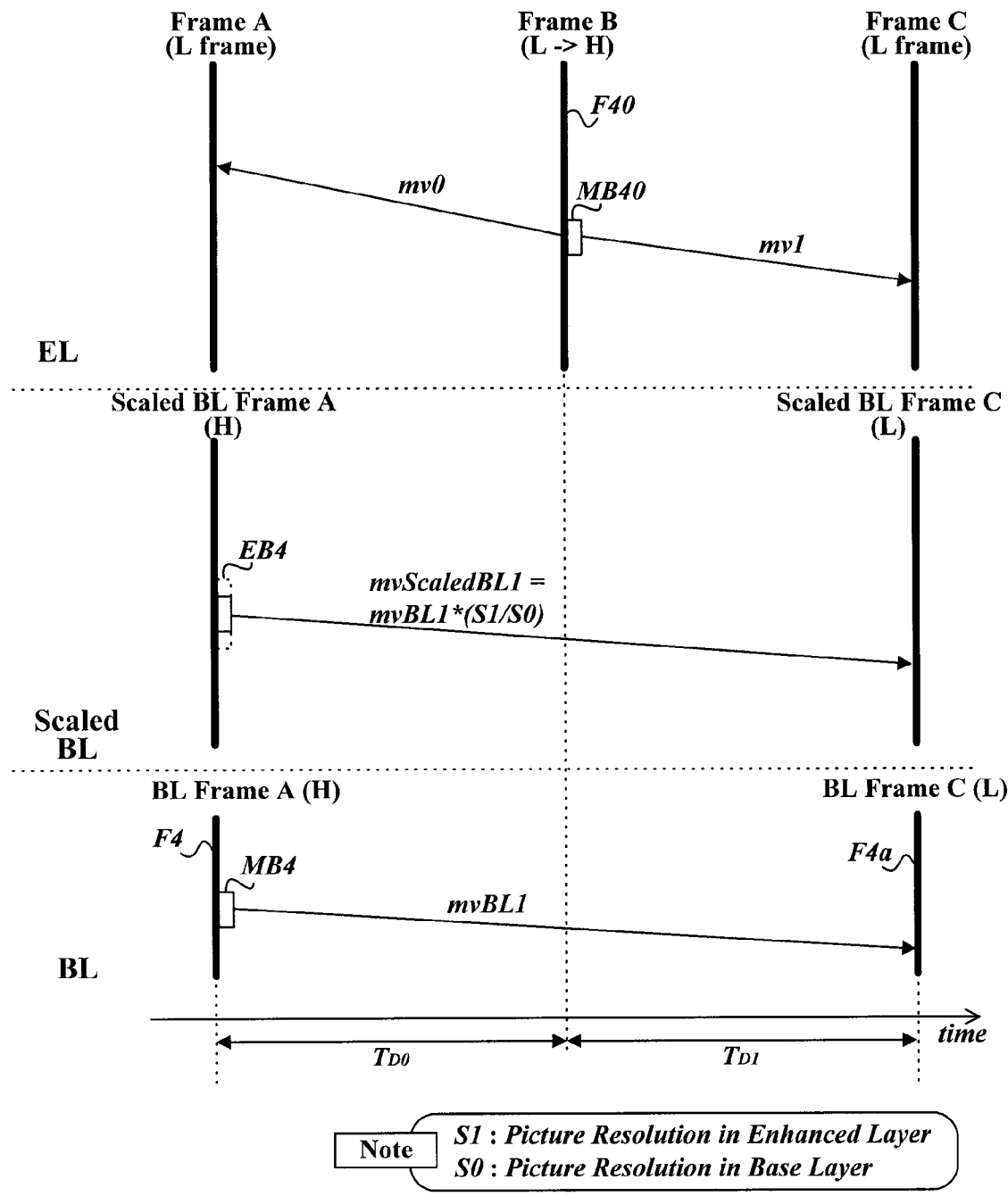

METHOD AND APPARATUS FOR SCALABLY ENCODING/DECODING VIDEO SIGNAL

This application is a National Phase entry of PCT Application No. PCT/KR2006/000359, filed on Feb. 1, 2006, which claims priority under 35 U.S.C. §119(e), 120 and 365 (c) to Korean Patent Application No. 10-2005-0051371, filed on Jun. 15, 2005, in the Korean Intellectual Property Office, and also claims priority to U.S. Provisional Application No. 60/648,420, filed on Feb. 1, 2005, in the U.S. Patent and Trademark Office, the contents of each of which are incorporated by reference in its entirety.

TECHNICAL FIELD

The present invention relates, in general, to the scalable encoding and decoding of a video signal and, more particularly, to a method and apparatus that uses a motion vector of a base layer picture at the time of scalably coding a video signal based on a motion compensated temporal filter, and decodes video data encoded using the motion vector.

BACKGROUND ART

It is difficult to assign a wide bandwidth, such as the bandwidth required for television (TV) signals, to digital video signals that are transmitted in a wireless manner through mobile phones or notebook computers, which are currently widely used, or through mobile TVs or hand-held Personal Computers (PCs), which will be widely used in the future. Therefore, a standard to be used in a video compression scheme for such mobile devices needs to have higher video signal compression efficiency.

Moreover, such mobile devices inevitably have varying inherent capabilities of processing or presenting video signals. Therefore, a compressed image must be variously prepared in advance to correspond to such capabilities, which means that video data having various image qualities, with respect to various combined parameters, such as the number of frames per second, the resolution, and the number of bits per pixel, must be provided for a single image source, thus inevitably placing a great burden on content providers.

For this reason, a content provider prepares compressed video data having a high bit rate for each individual image source, and, when the mobile device requests the video data, performs a procedure of decoding a compressed image and encoding the decoded image into video data suitable for the video processing capability of the mobile device that requested the image, and then provides the encoded video data. However, such a scheme must be accompanied by a transcoding (decoding+encoding) procedure, so that a slight time delay occurs at the time of providing the image requested by the mobile device. Further, the transcoding procedure also requires complicated hardware devices and algorithms depending on the variety of encoding targets.

A Scalable Video Codec (SVC) has been proposed to overcome these obstacles. SVC is a scheme of encoding video signals at the highest image quality when encoding the video signals, and enabling image quality to be secured to some degree even though only a part of the entire picture sequence generated as a result of the encoding (a sequence of frames intermittently selected from the entire sequence) is decoded and used. A Motion Compensated Temporal Filter (MCTF) scheme is an example of an encoding scheme proposed for use in a scalable video codec.

As described above, even if only a partial sequence of a picture sequence encoded by the MCTF, which is a scalable scheme, is received and processed, image quality can be secured to some degree. However, if the bit rate is decreased, the deterioration of image quality becomes serious. In order to solve the problem, a separate sub-picture sequence for a low bit rate, for example, small screens and/or a picture sequence having a small number of frames per second, can be provided.

A sub-picture sequence is called a base layer, and a main picture sequence is called an enhanced (or enhancement) layer. However, since the base layer and the enhanced layer are obtained by encoding the same image content, redundant information (redundancy) exists in video signals of the two layers. Therefore, in order to improve the coding efficiency of the enhanced layer, the video frame of the enhanced layer may be generated into a predictive image on the basis of an arbitrary video frame of the base layer temporally coincident with the video frame of the enhanced layer, or the motion vector of an enhanced layer picture may be coded using the motion vector of a base layer picture temporally coincident with the enhanced layer picture. FIG. 1 illustrates a coding procedure using the motion vector of the base layer picture.

The motion vector coding procedure of FIG. 1 is described. If the frame of a base layer has a smaller screen size than that of the frame of an enhanced layer, a frame F1 of the base layer, temporally coincident with a frame F10 of the enhanced layer to be generated as a current predictive image, is extended to have the same size as the enhanced layer frame F10. In this case, the motion vectors of respective macroblocks in the base layer frame are scaled at the same extension rate as that of the base layer frame F1.

Further, a motion vector mv1 is detected through a motion estimation operation on an arbitrary macroblock MB10 within the enhanced layer frame F10. The motion vector mv1 is compared to a scaled motion vector mvScaledBL1 of a motion vector mvBL1 (this motion vector is obtained by a base layer encoder prior to the encoding of the enhanced layer) of a macroblock MB1 in the base layer frame F1 covering an area corresponding to the macroblock MB10 (if the enhanced layer and the base layer use macroblocks having the same size, for example, 16×16 macroblocks, the macroblock of the base layer covers a wider area in a frame than does the macroblock of the enhanced layer).

If the two vectors mv1 and mvScaledBL1 are equal to each other, a value, indicating that the motion vector mv1 of the macroblock MB10 in the enhanced layer is equal to the scaled motion vector of the corresponding block MB1 of the base layer, is recorded in a block mode. In contrast, if the two vectors differ, the difference between the vectors, that is, 'mv1−mvScaledBL1' is coded when the coding of the difference vector 'mv1−mvScaledBL1' is more profitable than the coding of the vector mv1, thus reducing the amount of vector-coded data at the time of coding the enhanced layer. However, since the base layer and the enhanced layer have different encoded frame rates, there exists a plurality of frames of the enhanced layer, which do not have temporally coincident frames in the base layer. For example, a frame B of FIG. 1 is such a frame. Since the frame B does not have a corresponding base layer frame temporally coincident with the frame B, the above method cannot be applied to the frame B.

However, even if the frames do not temporally coincident with each other, an enhanced layer frame and a base layer frame having a small temporal gap therebetween are adjacent images, so that there is a high probability that the frames have correlation therebetween with respect to motion estimation. In other words, there is a high probability that the directions of motion vectors are similar to each other, so, even in this case, coding efficiency can be improved using the motion vector of the base layer.

DISCLOSURE OF INVENTION

An object of the present invention is to provide a method and apparatus that use a motion vector of an arbitrary picture of a base layer, that does not temporally correspond to a picture to be encoded as a predictive image, when scalably encoding an image.

Another object of the present invention is to provide a method and apparatus that decode a data stream of an enhanced layer, in which an image block is encoded to use the motion vector of a temporally separated base layer picture.

A further object of the present invention is to provide a method and apparatus that derive a motion vector for a predictive image from the motion vector of the base layer at the time of utilizing the motion vector of the base layer when an image is encoded as a predictive image using a scalable method or when the encoded image is decoded.

In order to accomplish the above objects, the present invention is characterized in that a video signal is encoded using a preset method, and a bit stream of a second layer is output at the same time that the video signal is encoded using a scalable MCTF method and a bit stream of a first layer is output. When the video signal is encoded using the MCTF method, information about a motion vector of an image block, included in an arbitrary frame of the video signal, is recorded as information indicating to use a motion vector of a block, located at the same location as that of the image block, within a sub-frame that is temporally separated from the arbitrary frame, wherein the sub-frame is included in a bit stream of the second layer.

According to an embodiment of the present invention, when information about the motion vector of the image block is recorded, the motion vector of a block within the sub-frame of the second layer having a predictive image, that is temporally closest to the arbitrary frame of the first layer, is used.

According to another embodiment of the present invention, a motion vector of a block within the sub-frame, which spans a time interval other than a time interval (an interval between left and right frames) in which the frame including the image block exists, is used.

According to a further embodiment of the present invention, when the use of a motion vector of a block within a sub-frame is advantageous with respect to the amount of information, information about a motion vector of a current image block is recorded as information indicating to use the motion vector of the block within the sub-frame.

According to still another embodiment of the present invention, the sub-frame of the second layer has a screen size smaller than or equal to that of the frame of the first layer.

According to still another embodiment of the present invention, a vector, obtained by multiplying a motion vector of a block within the sub-frame by both the ratio of the screen size of the frame of the first layer to the screen size of the sub-frame of the second layer (that is, a resolution ratio) and the ratio of the time intervals between frames, is used.

According to still another embodiment of the present invention, a derivative coefficient is determined from the ratio of the time interval between the arbitrary frame and a frame arranged in a direction, in which a vector is derived, to the time interval between the sub-frame and another frame, including a block indicated by the motion vector.

According to still another embodiment of the present invention, a mode of a block within the sub-frame and a vector derived from the motion vector are used at the time of coding the image block.

According to still another embodiment of the present invention, the mode of the image block is designated as a mode for deriving a pair of vectors directed in the same direction as a motion vector of a corresponding block within the sub-frame and utilizing the pair of vectors.

BRIEF DESCRIPTION OF DRAWINGS

The accompanying drawings, which are included to provide a further understanding of the invention, illustrate the preferred embodiments of the invention, and together with the description, serve to explain the principles of the present invention.

FIGS. 4a and 4b illustrate exemplary procedures of obtaining a motion vector of a corresponding macroblock using a motion vector of a base layer frame temporally separated from a frame to be encoded as a predictive image according to the present invention;

Features, elements, and aspects of the invention that are referenced by the same numerals in different figures represent the same, equivalent, or similar features, elements, or aspects in accordance with one or more embodiments.

MODES FOR CARRYING OUT THE INVENTION

Hereinafter, embodiments of the present invention will be described in detail with reference to the attached drawings.

Figure 1:
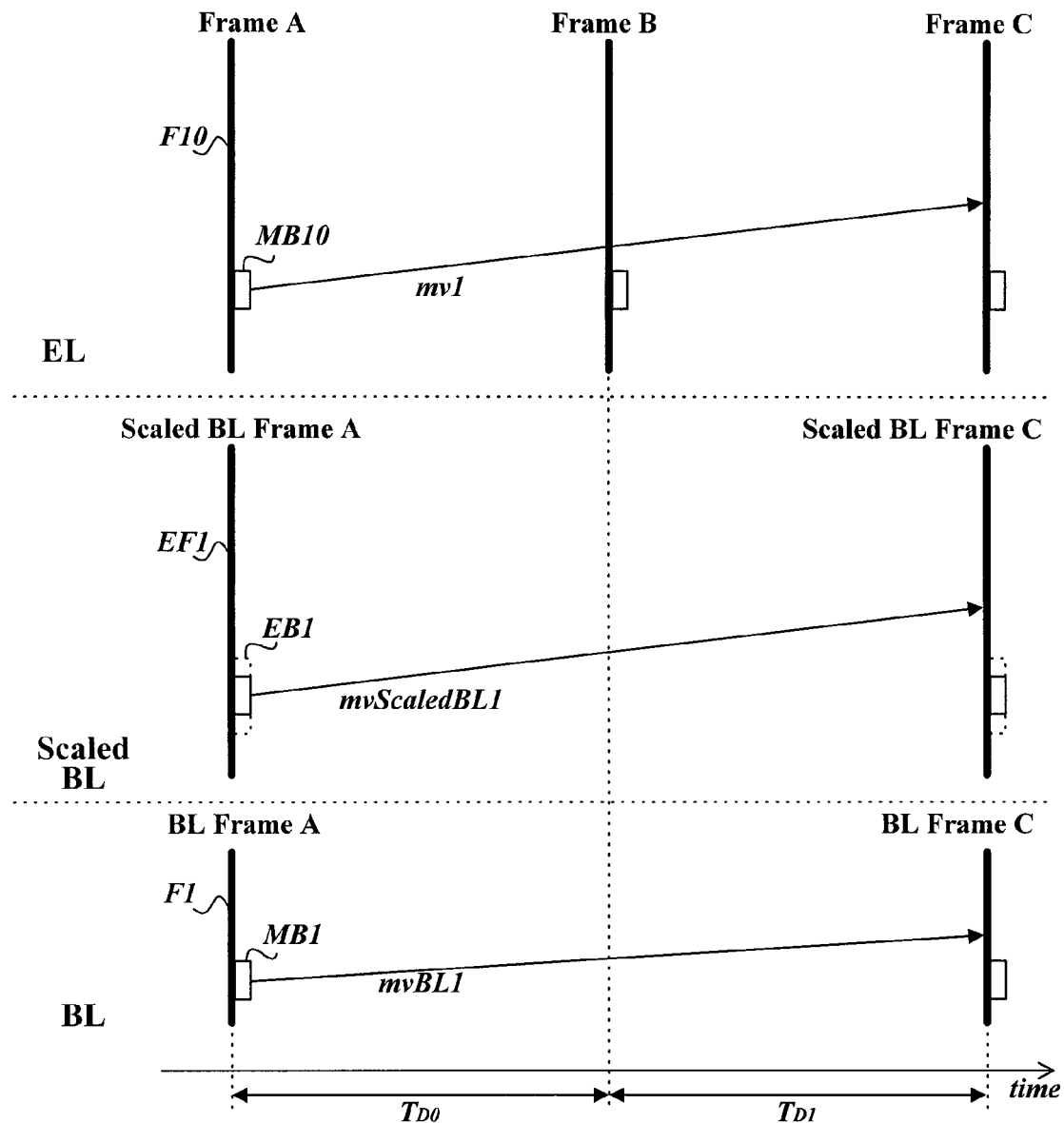
FIG. 1 illustrates a coding procedure using a motion vector of a base layer picture.
Figure 2:
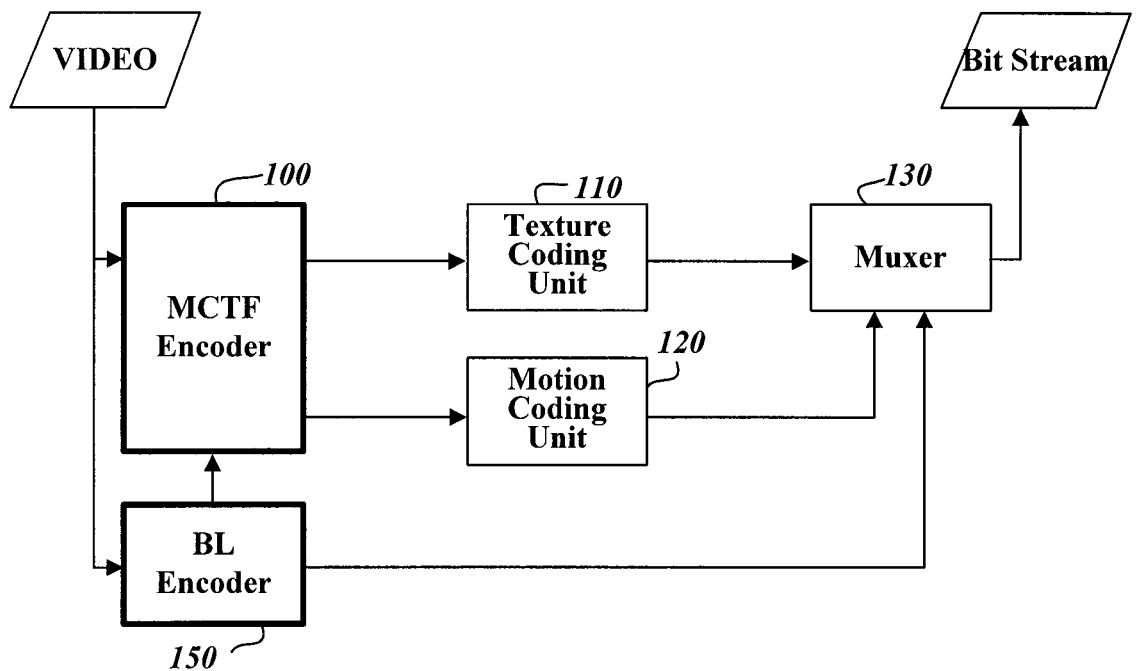
FIG. 2 is a block diagram showing the construction of a video signal encoding apparatus to which a video signal coding method is applied according to the present invention.

FIG. 2 is a block diagram showing the construction of a video signal encoding apparatus to which a method of scalably coding a video signal is applied, according to the present invention.

The video signal encoding apparatus of FIG. 2 of the present invention includes a Motion Compensated Temporal Filter (MCTF) encoder 100 for encoding an input video signal in macroblocks using an MCTF method and generating suitable management information, a texture coding unit 110 for transforming information about each encoded macroblock into a compressed bit stream, a motion coding unit 120 for coding the motion vectors of image blocks, obtained by the MCTF encoder 100, into a compressed bit stream using a preset method, a base layer encoder 150 for encoding the input video signal using a preset method, for example, MPEG 1, 2 or 4, or H.261, H.263 or H.264, and generating a sequence of small screens, for example, a sequence of pictures having a size of 25% of an original size (the ratio of actual areas is ¼, but the typical ratio of screen sizes means the ratio of lengths of sides of screens, so the screen size can be considered to be ½), and a multiplexer (muxer) 130 for encapsulating the output data of the texture coding unit 110, the output sequence of the base layer encoder 150 and the output vector data of the motion coding unit 120 in a preset format, selectively multiplexing the encapsulated format data in a preset transmission format, and outputting the data in that transmission format. The base layer encoder 150 can encode the input video signal into a sequence of small screens having a size smaller than the picture of the enhanced layer, thus providing a data stream having a low bit rate. However, the input video signal may be encoded into pictures having the same size as the pictures of the enhanced layer at a frame rate lower than the frame rate of the enhanced layer, thus providing a data stream having a low bit rate. In embodiments of the present invention, which will be described below, the base layer is encoded into a sequence of small screens.

Figure 3:
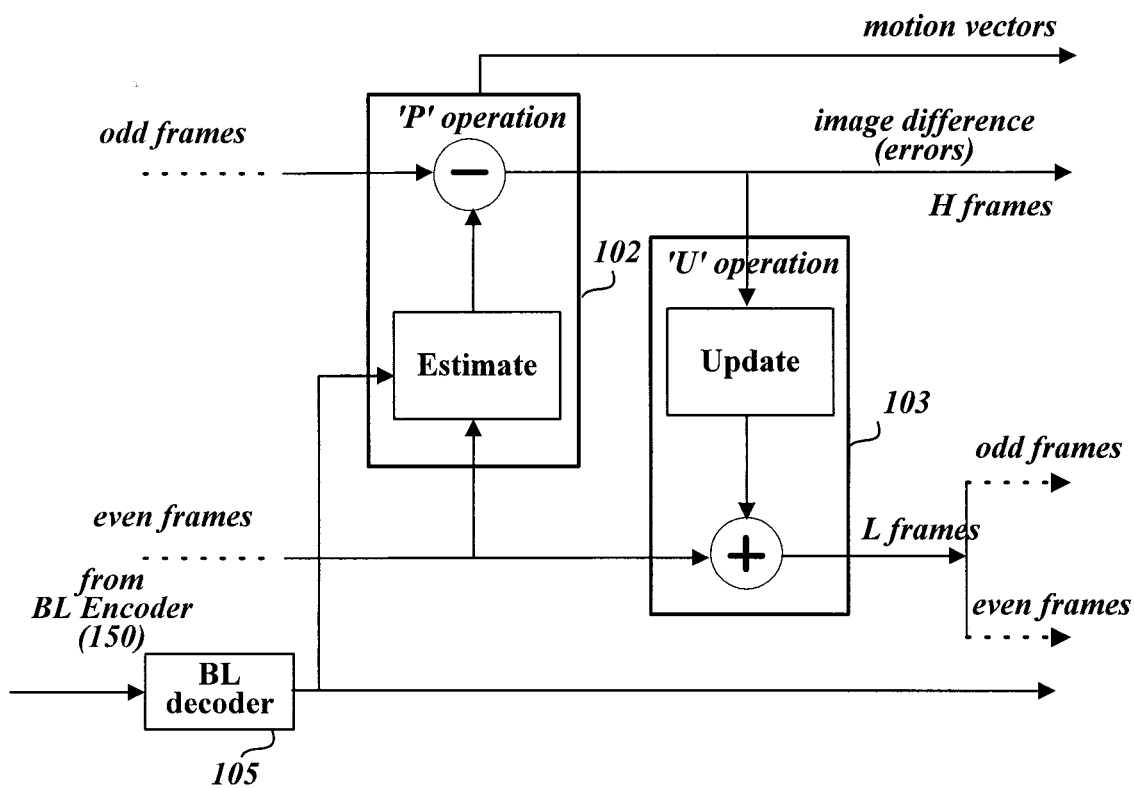
FIG. 3 is a diagram showing partial construction of a filter for performing video estimation/prediction and update operations in the MCTF encoder of FIG. 2.

The MCTF encoder 100 performs motion estimation and prediction operations on a macroblock within an arbitrary video frame, and also performs an update operation of adding an image difference between the macroblock within the arbitrary video frame and a macroblock within an adjacent frame to the macroblock within the arbitrary video frame. FIG. 3 is a diagram showing partial construction of a filter for performing the above operations.

The MCTF encoder 100 separates a sequence of input video frames into odd-numbered and even-numbered frames, and performs estimation/prediction and update operations several times, for example, until the number of L frames (resultant frames caused by an update operation) existing in a single Group of Pictures (GOP) is 1. The construction of FIG. 3 shows the components related to the estimation/prediction and update operations corresponding to a single stage of the repeated operations (also designated as an 'MCTF level').

The construction of FIG. 3 includes a base layer (BL) decoder 105 having the function of extracting a motion vector of each motion-estimated macroblock from the encoded stream output from the base layer encoder 150 (in an inter-frame mode) and scaling the motion vector of each motion-estimated macroblock at an up-sampling rate required to reconstruct a sequence of small-screen pictures into pictures of an original image size, an estimation/prediction unit 102 for detecting a reference block for each macroblock within a frame to be coded to have residual data, through motion estimation, from previous and/or subsequent adjacent frames, coding an image difference between the reference block and the actual macroblock (difference value between corresponding pixels), and directly calculating the motion vector to the reference block, or generating information using the motion vector of a corresponding block scaled by the BL decoder 105, and an update unit 103 for performing an update operation of multiplying the image difference by a suitable constant, for example, ½ or ¼, with respect to a macroblock which has been detected as the reference block through the motion estimation, and then adding the multiplication result value to the reference block. The operation performed by the update unit 103 is called a 'U' operation, and the frame generated through the 'U' operation is called an 'L' frame. In this case, the motion vector scaling function can be performed by a separate device provided outside the base layer decoder.

The estimation/prediction unit 102 and the update unit 103 can simultaneously perform operations in parallel on a plurality of slices divided from a single frame, rather than on a single video frame. A frame (or slice) having the image difference (predictive image) generated by the estimation/prediction unit 102 is called an 'H' frame (or slice). Data about a difference value existing in the 'H' frame (or slice) reflects a high frequency component of the video signal. The term 'frame' used in the following embodiments is used to naturally include the meaning of 'slice' when the frame is replaced with the slice as a technical equivalent.

The estimation/prediction unit 102 performs a procedure of separating each input video frame (or each L frame obtained in a previous stage) into macroblocks having a preset size, coding a corresponding macroblock through motion estimation between frames, and directly obtaining the motion vector of the macroblock, or recording, in a suitable header field, information required to obtain the motion vector of a macroblock using the motion vector of a corresponding block of a temporally coincident base layer frame if the temporally coincident frame exists in extended base layer frames provided by the BL decoder 105. Since a detailed procedure thereof is well-known technology, and a detailed description thereof is not directly related to the present invention, a detailed description thereof is omitted. A description is made in detail with reference to exemplary procedures of FIGS. 4a and 4b of obtaining the motion vector of a corresponding macroblock using the motion vector of a base layer frame, temporally separated from an enhanced layer frame, according to the present invention.

The example of FIG. 4a shows that a frame to be encoded as a current predictive image frame (H frame) is a frame B (F40), and a frame C is coded as a predictive frame in the frame sequence of the base layer. If a frame temporally coincident with the frame F40 of the enhanced layer to be generated as a current predictive image does not exist in the frame sequence of the base layer, the estimation/prediction unit 102 detects the predictive frame of the base layer temporally closest to the current frame F40, that is, the frame C. Actually, information about the frame C is detected from the encoding information provided by the BL decoder 105.

Further, a block having the highest correlation with the macroblock MB40, which is to be generated as a predictive image within the current frame F40, is detected from the previous and/or subsequent adjacent frames, and the image difference between the detected block and the macroblock MB40 is coded. Such an operation is called a 'P' operation. The frame generated through the 'P' operation is called an 'H' frame. Further, the block having the highest correlation is a block having the lowest image difference with respect to a target image block. The intensity of the image difference is defined by, for example, the sum of difference values between pixels or the mean value of the difference values. The block having the lowest image difference is the reference block. A plurality of reference blocks may be used in such a way that a single reference block exists for each reference frame.

If reference blocks for the current macroblock MB40 are detected, for example, in a bi-directional mode, as shown in FIG. 4a, the estimation/prediction unit 102 derives both motion vectors mv0 and mv1, directed to respective reference blocks, from the motion vector of a corresponding block MB4 of the predictive frame F4 of the base layer, that is, a motion vector mvBL0 (this block MB4 is extended and has an area EB4 covering a block having the same size as the macroblock MB40 within the frame). The motion vector of the base layer is obtained by the base layer encoder 150 and is transmitted in the header information of each macroblock. The frame rate is also transmitted in the GOP header information. Accordingly, the BL decoder 105 examines only header information, without decoding encoded video data, extracts required encoding information, that is, the frame time, frame size, a block mode and a motion vector of each macroblock, etc., and provides the extracted information to the estimation/prediction unit 102.

The estimation/prediction unit 102 receives the motion vector mvBL0 of the corresponding block MB4 from the BL decoder 105, and obtains vectors calculated for the current macroblock MB40 based on the motion vector mvBL0 using the following equations, for example, derived vectors mv0' and mv1' corresponding to the motion vectors mv0 and mv1, $$mv0'=mvBL0*(S1/S0)*T_{D0}/(T_{D0}+T_{D1}) \quad (1a)$$

$$mv1'=-mvBL0*(S1/S0)*T_{D1}/(T_{D0}+T_{D1}) \quad (1b)$$

where TD1 and TD0 denote respective temporal differences between the current frame F40 and both frames of the base layer (the predictive frame F4, temporally closest to the current frame F40, and the reference frame F4a of the predictive frame F4), S0 is the resolution of the base layer, S1 is the resolution of the enhanced layer, and a resolution ratio of S1/S0 is the ratio of the screen size of the enhanced layer frame to that of the base layer frame.

Equations (1a) and (1b) are used to obtain component of the scaled motion vector of the corresponding block (mvScaledBL0 of FIG. 4a), wherein the components correspond to respective ratios of temporal differences from the frame B to respective reference frames of the enhanced layer (frames including the reference block), wherein the motion vector of the corresponding block is scaled according to the screen size ratio (resolution ratio). In other words, with respect to the motion vector mvBL0 of the corresponding block, components, corresponding to respective ratios of the temporal differences from the frame B to respective reference frames A and C, of the motion vector mvBL0 are obtained, and the obtained components are scaled according to the screen size ratio. If the direction of a target vector to be derived is opposite to the direction of the motion vector of the corresponding block, the estimation/prediction unit 102 attaches a negative sign to the equation, as shown in Equation (1b), and derives the motion vector.

When the vectors mv0' and mv1' derived through the above procedure are identical to the actually obtained motion vectors mv0 and mv1, the estimation/prediction unit 102 records only information, indicating that the actually obtained vectors are identical to the vectors derived from the motion vectors of the base layer, in the header of the corresponding macroblock MB40, and does not transmit information about the actually obtained motion vectors mv0 and mv1 to the motion coding unit 120. That is, the motion vectors are not coded.

In the case where the derived vectors mv0' and mv1' are different from the actually obtained motion vectors mv0 and mv1, if the coding of the difference vectors mv0−mv0' and mv1−mv1' between the actual vectors and the derived vectors is advantageous compared to the coding of the actual vectors mv0 and mv1, for example, from the standpoint of the amount of data, the difference vectors are transmitted to the motion coding unit 120 to cause the difference vectors to be coded, and information, indicating that the difference vectors between the actual vectors and the vectors derived from the base layer have been recorded, is recorded in the header of the corresponding macroblock MB40. If the coding of the difference vectors is disadvantageous, the actually obtained vectors mv0 and mv2 are preferably coded.

Only one of both the frames F4 and F4a of the base layer, temporally closest to the current frame F40, is a predictive frame. This means that, since the decoder of the base layer can specify a predictive frame, there is no need to transmit information, indicating which motion vector is used from the adjacent frames. Therefore, when a value indicating derivation from the motion vector of the base layer is recorded in header information and is transmitted, information indicating which base layer frame is used is not encoded.

The example of FIG. 4b shows the case where a frame to be encoded as a current predictive image is a frame B (F40), and a frame A is coded as a predictive frame in the frame sequence of the base layer. In this case, the direction of the motion vector mvBL1 of a corresponding block MB4 to be used to derive respective motion vectors for a current macroblock MB40 is opposite to the direction of FIG. 4a, so that Equations (1a) and (1b) for deriving motion vectors are changed to the following Equations (2a) and (2b).

$$mv0'=-mvBL1*(S1/S0)*T_{D0}/(T_{D0}+T_{D1}) \quad (2a)$$

$$mv1'=mvBL1*(S1/S0)*T_{D1}/(T_{D0}+T_{D1}) \quad (2b)$$

Figure 5A:
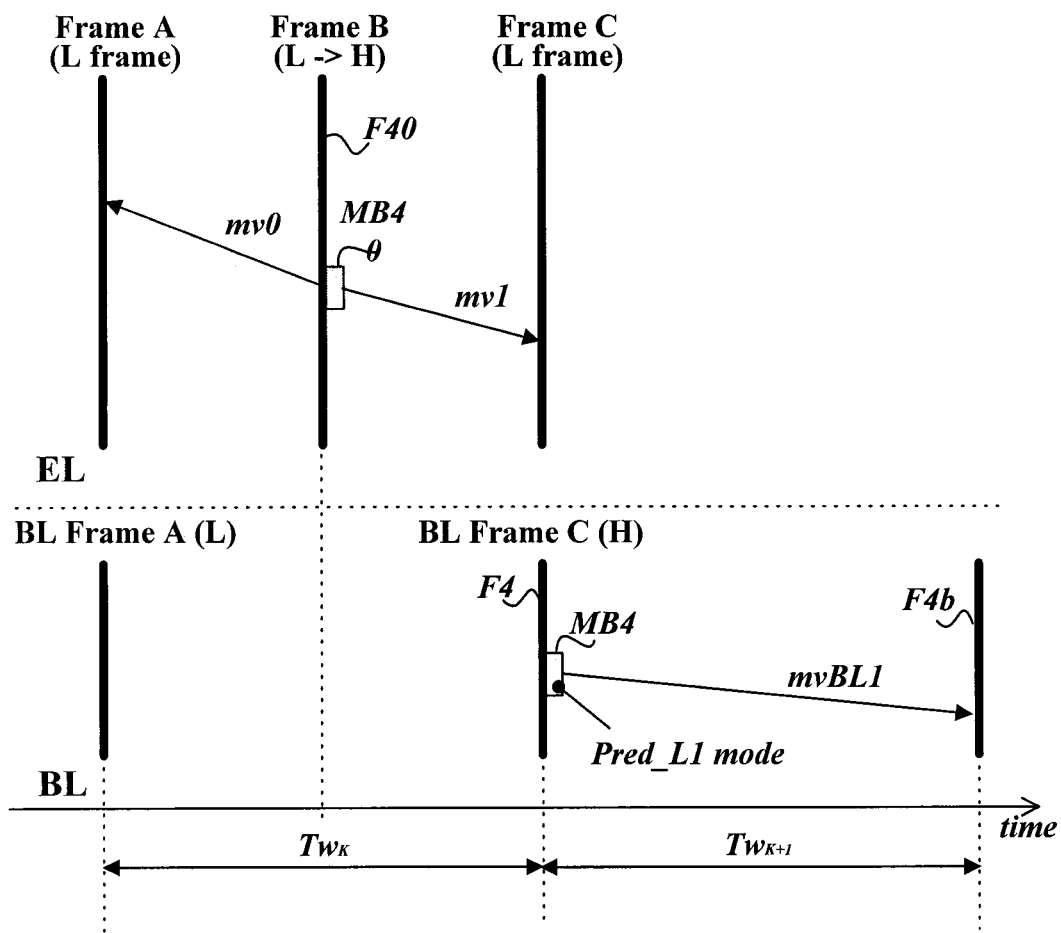
FIGS. 5a and 5b illustrate the cases where a motion vector of a corresponding block of an adjacent base layer frame does not exist in a time interval in which a frame to be coded as a predictive image exists (an interval between left and right frames)

Meanwhile, the corresponding block MB4 within the predictive frame F4 of the base layer, temporally closest to the frame F40 to be coded as a current predictive image, may be in a single predictive (Pred_L0 or Pred_L1) mode, rather than a bi-predictive mode. If the corresponding block MB4 is in the single predictive mode, the corresponding block MB4 can have a motion vector only in a time interval other than the time interval between the previous and subsequent frames adjacent to the current frame F40 (frame A and frame C). For example, as shown in the example of FIG. 5a, the corresponding block MB4 of the base layer is in a single predictive Pred_L1 mode, and can have a vector that spans only a time interval TwK+1 subsequent to a current time interval TwK. Further, as shown in the example of FIG. 5b, the corresponding block MB4 of the base layer is in a single predictive Pred_L0 mode, and can have a vector that spans only the time interval TwK−1 previous to the current time interval TwK.

Hereinafter, an embodiment of the present invention of utilizing a motion vector when the corresponding block of the base layer has the motion vector spanning only a time interval other than the current time interval, that is, when the corresponding block has the motion vector directed in the same direction as the temporal direction from the current frame to the corresponding block, is described in detail.

Figure 5B:
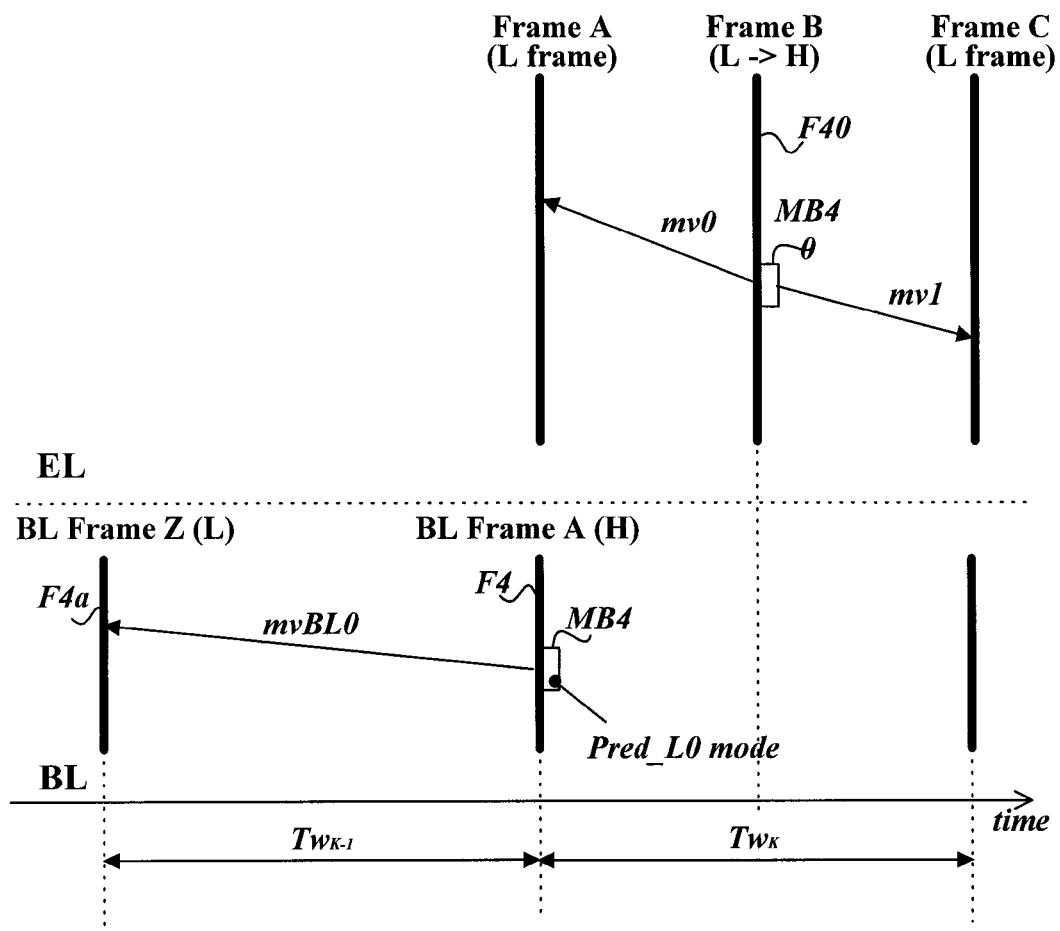

In the embodiment of the present invention, the derived vector mv0' or mv1' is first obtained from the motion vector mvBL0 or mvBL1 of the corresponding block MB4 using the following Equations, in the cases of FIGS. 5a and 5b.

$$mv0'=mvBL0*(S1/S0)*T_{D0}/T_D, \text{ or} \quad (3a)$$

$$mv1'=mvBL1*(S1/S0)*T_{D1}/T_D \quad (3b)$$

At this time, only the vector having the same direction as the motion vector of the corresponding block MB4 is derived.

TD0 and TD1 are temporal differences between a current frame F40 and respective frames A and C adjacent thereto in a derivation direction, and TD is the temporal difference between the frame F4, including the corresponding block, in the base layer and the reference frame F4a or F4b thereof.

Further, the results of coding of the macroblock MB40 obtained through the following methods are compared to each other. For example, the resultant values of cost functions based on the amount of information and image quality are compared to each other.

1) Designation of an actually obtained block mode, and coding of a macroblock using actually obtained motion vectors (mv0 and/or mv1)

2) Designation of an actually obtained block mode, coding of a macroblock using actually obtained motion vectors (mv0 and/or mv1), and coding of a difference vector (mv1−mv1' in FIG. 6a and mv0−mv0' in FIG. 6b) between a motion vector directed in the same direction as a derived vector, among actually obtained motion vectors, and the derived vector 3) Coding of a macroblock using the block mode of a corresponding block and the derived vector of the corresponding block 4) Designation of a mode to be equal to the block mode of a corresponding block, and coding of a macroblock using a secondary motion vector (mv0 or mv1) obtained through re-prediction operation on an area based on a derived vector, wherein a difference vector (mv0−mv0' or mv1−mv1') between the secondary motion vector and the derived vector (mv0' or mv1') is motion-coded.

The above four cases are only parts of various examples according to the present invention, using the vectors derived from the motion vectors of the base layer that span different time intervals. Various methods can be additionally used without departing from the gist of the present invention.

Figure 6A:
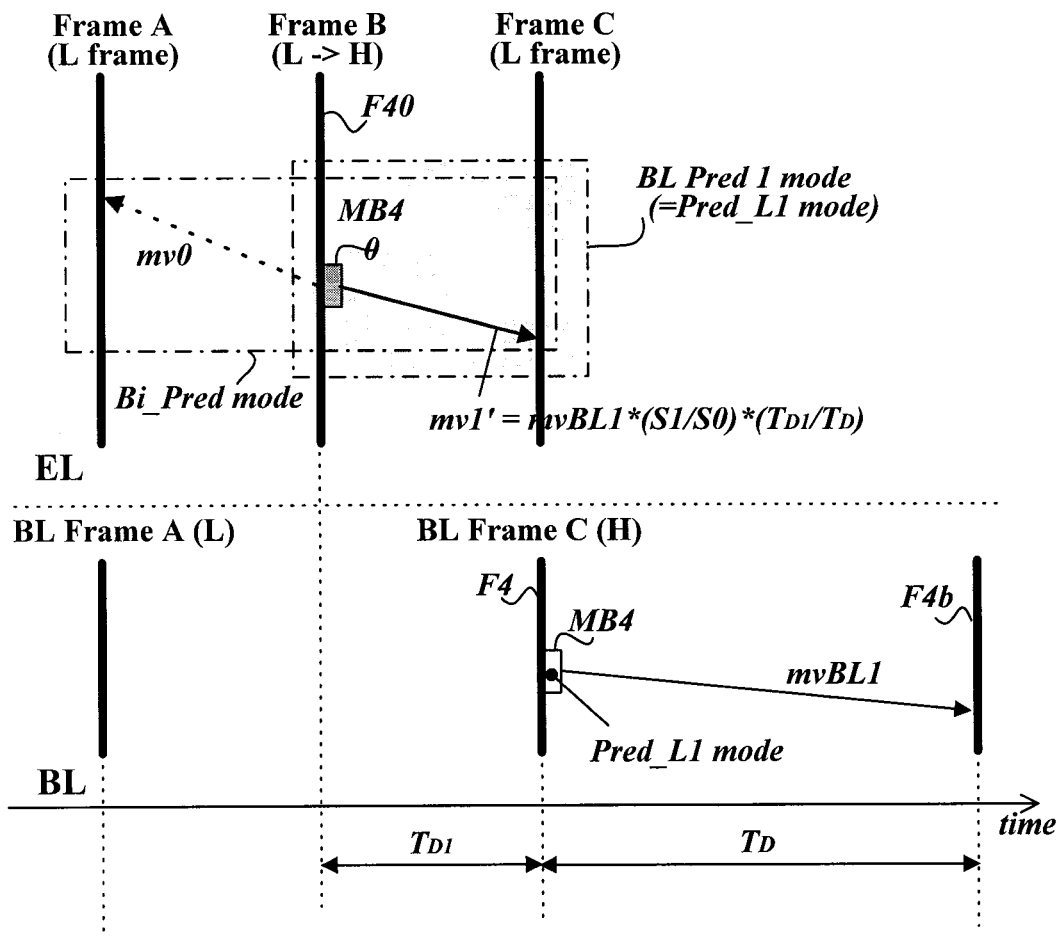
FIGS. 6a and 6b illustrate examples of a method of coding a macroblock using a motion vector of a base layer frame according to embodiments of the present invention in the cases of FIGS. 5a and 5b.
Figure 6B:
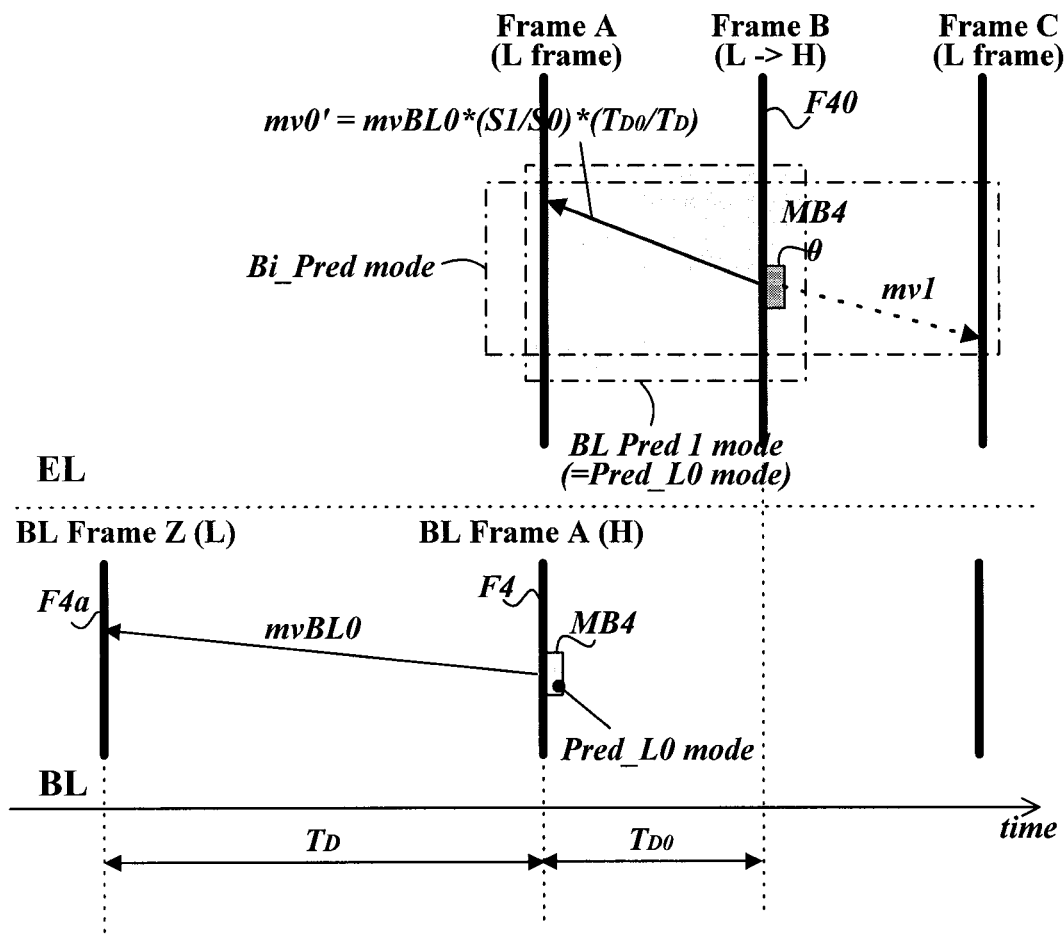

The estimation/prediction unit 102 selects the coding scheme having the lowest cost from the resultant values of the cost functions for the four presented methods. In the cases of 1) and 2), a block mode is recorded as an actual block mode obtained through a prediction operation for the current macroblock MB40, for example, a bi-predictive (Bi_Pred) mode, as shown in FIGS. 6a and 6b. In addition, in the case of 2), information, indicating that the difference vector between the derived vector of the corresponding block MB4 and the actually obtained vector has been coded, is recorded in a block header. In the cases of 3) and 4), as shown in FIGS. 6a and 6b, a block mode is recorded as a mode using the block mode of the corresponding block of the base layer (BL Pred 1 mode: the name of this mode is arbitrarily designated, so that another name can be used). In particular, in the case of 4), the difference vector mv0−mv0' or mv1−mv1' between the actual vector and the secondary motion vector, obtained through a re-prediction operation, is transmitted to the motion coding unit 120 to cause the difference vector to be compressed and coded. A BL Pred 1 mode is a mode for utilizing the block mode of the corresponding block MB4 and deriving a motion vector as a single vector. In contrast, a BL Pred 2 mode, which will be described later, is the Bi_Pred mode for deriving a pair of vectors in the same direction as that of a vector based on the block mode of the corresponding block of the base layer. Meanwhile, in the cases of 3) and 4), a block mode can be designated as a mode, designated by the corresponding block, for example, Pred_L0 or Pred_L1 mode, without being designated as the BL Pred 1 mode. In this case, in order to detect the reference block for the current macroblock, information, indicating that a vector must be derived from the motion vector of the corresponding block and be used, should be additionally recorded in the header of the current macroblock.

Figure 7A:
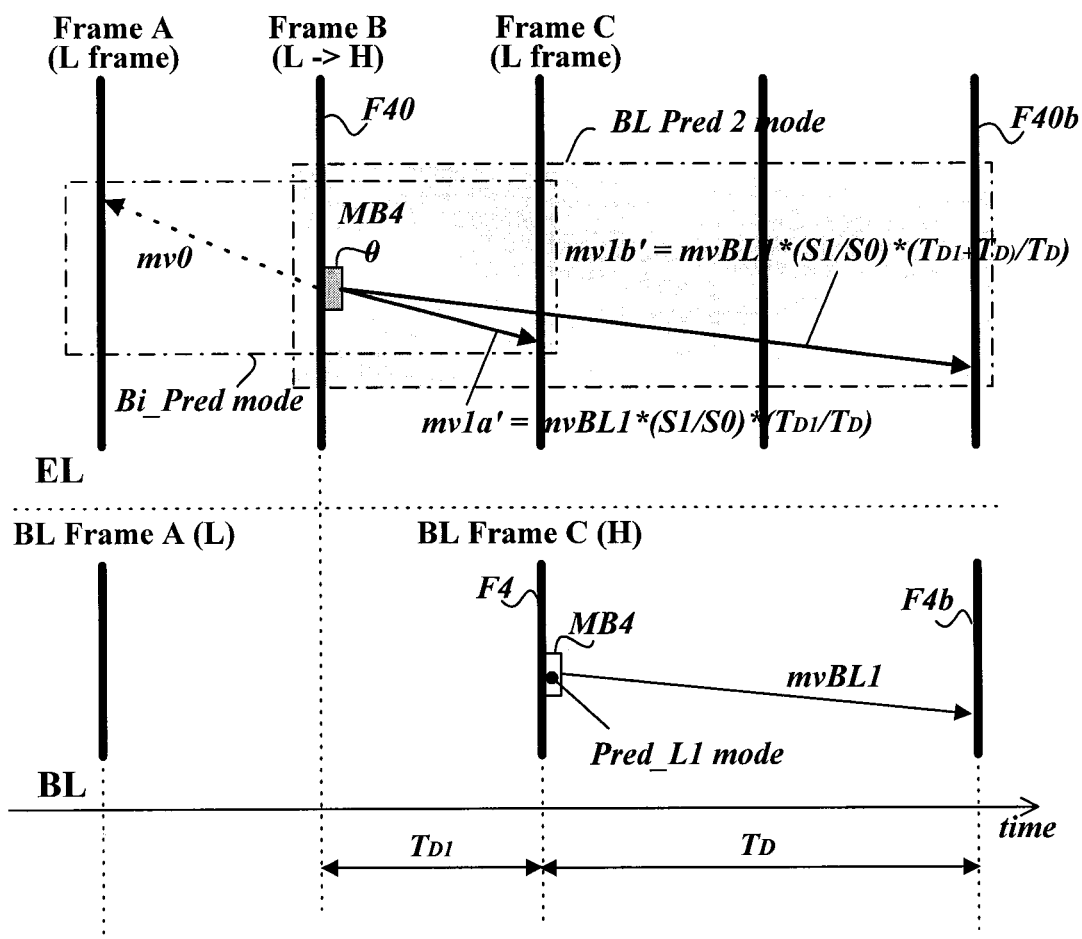
FIGS. 7a and 7b illustrate examples of a method of coding a macroblock using a motion vector of a base layer frame according to other embodiments of the present invention in the cases of FIGS. 5a and 5b.
Figure 7B:
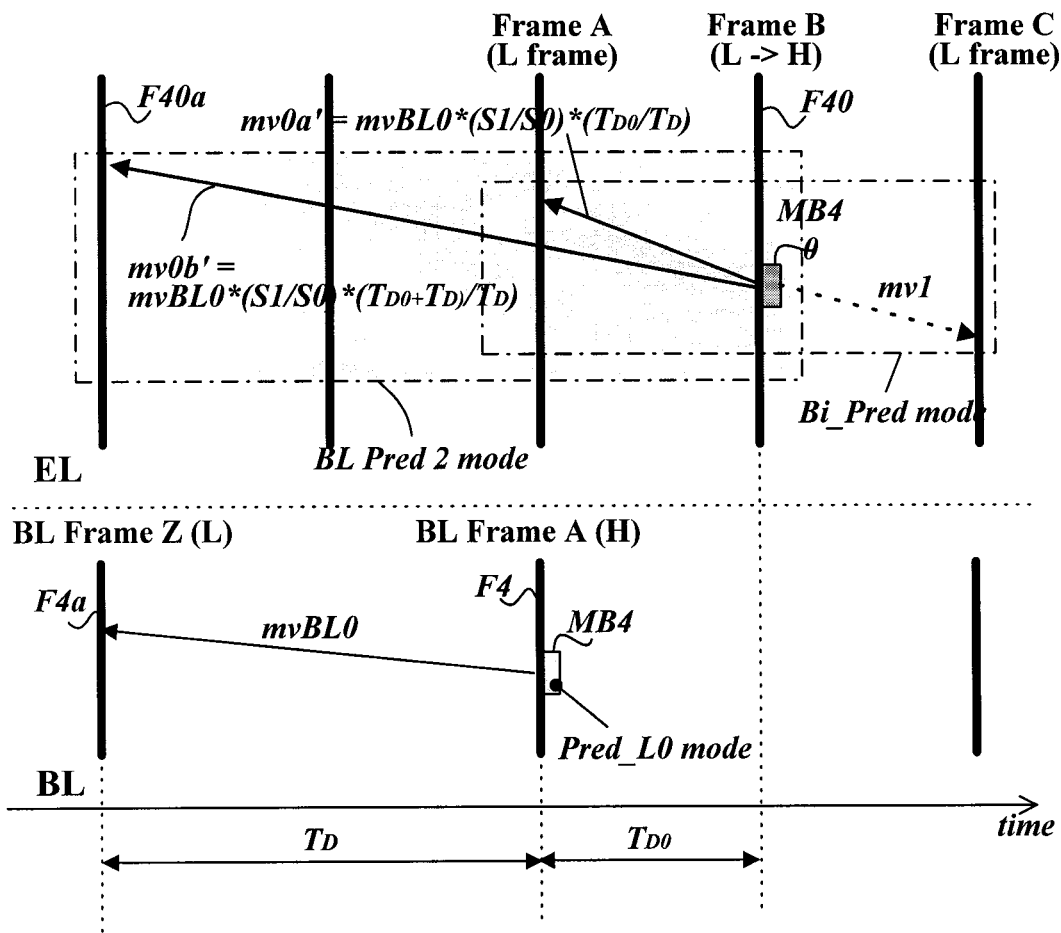

In another embodiment of the present invention, a pair of derived vectors mv0a' and mv0b' or mv1a' and mv1b', having the same direction as the motion vector mvBL0 or mvBL1 of the corresponding block MB4, is obtained from the motion vector mvBL0 or mvBL1 using the following Equations, in the cases of FIGS. 5a and 5b, $$mv0a' = mvBL0*(S1/S0)*T_{D0}/T_D \tag{4a}$$

$$mv0b' = mvBL0*(S1/S0)*(T_{D0}/T_D)/T_D, \text{ or} \tag{4b}$$

$$mv1a' = mvBL1*(S1/S0)*T_{D1}/T_D \tag{5a}$$

$$mv1b' = mvBL1*(S1/S0)*(T_{D1}/T_D)/T_D \tag{5b}$$

where TD0 and TD1 are temporal differences between the current frame F40 and respective frames A and C adjacent thereto in a derivation direction, as shown in FIGS. 7a and 7b, and TD is a time interval between the frame F40, including the corresponding block, in the base layer and the reference frame F4a or F4b. Further, in a pair of equations, mv0b' and mv1b' are required to obtain derived vectors directed to the frame F40a or F40b of the enhanced layer, temporally coincident with the reference frame of the corresponding block MB4, as shown in FIGS. 7a and 7b.

Further, results of coding of the macroblock obtained through the following methods are compared to each other, based on resultant values obtained by preset cost functions.

a) Coding of a macroblock using an actually obtained block mode and a motion vector (mv0 and/or mv1)

b) Coding of a macroblock using a BL Pred 2 mode and a pair of derived vectors c) Coding of a macroblock using a BL Pred 2 mode and a pair of secondary motion vectors (mv0a and mv0b or mv1a and mv1b), obtained through a re-prediction operation on an area based on a pair of derived vectors, wherein respective difference vectors (mv0a−mv0a' and mv0b−mv0b' or mv1a−mv1a' and mv1b−mv1b') between secondary motion vectors and the pair of derived vectors (mv0a' and mv0b' or mv1a' and mv1b') are motion-coded.

The above three cases are only parts of various examples of the present invention, and various methods can be additionally selected and used without departing from the gist of the present invention.

In the case of a), a block mode is recorded as an actual block mode obtained through a prediction operation for the current macroblock MB40, for example, Bi_Pred mode, as shown in FIGS. 7a and 7b. Cases b) and c) use the vectors derived from the motion vector of the corresponding block, and use reference blocks in a plurality of frames in the same direction, unlike the above embodiment.

The estimation/prediction unit 102 selects the coding scheme having the lowest cost from the resultant values of the cost functions for the three presented methods, codes the current macroblock MB40, designates a block mode, and causes motion vector information corresponding to the block mode to be coded.

Meanwhile, embodiments of FIGS. 6a and 6b and embodiments of FIGS. 7a and 7b have been separately described, but the estimation/prediction unit 102 is not limited to one selected from among the two embodiments, but can perform both embodiments at the time of coding an arbitrary macroblock, thus performing optimal coding.

For example, as described above, the estimation/prediction unit 102 derives a pair of motion vectors mv0a' and mv0b' or mv1a' and mv1b' from the motion vector of the corresponding block, performs the above-described cases 1), 2), 3) and 4) and b) and c), and selects a single scheme capable of obtaining optimal coding efficiency from the cases, thereby performing a block mode selection, residual coding and motion vector coding, based on the selected scheme.

A data stream composed of a sequence of L and H frames encoded by the above-described method can be transmitted to a decoding apparatus in a wired or wireless manner or through a recording medium. The decoding apparatus reconstructs the original video signal of the enhanced layer and/or base layer depending on a method which will be described later.

Figure 8:
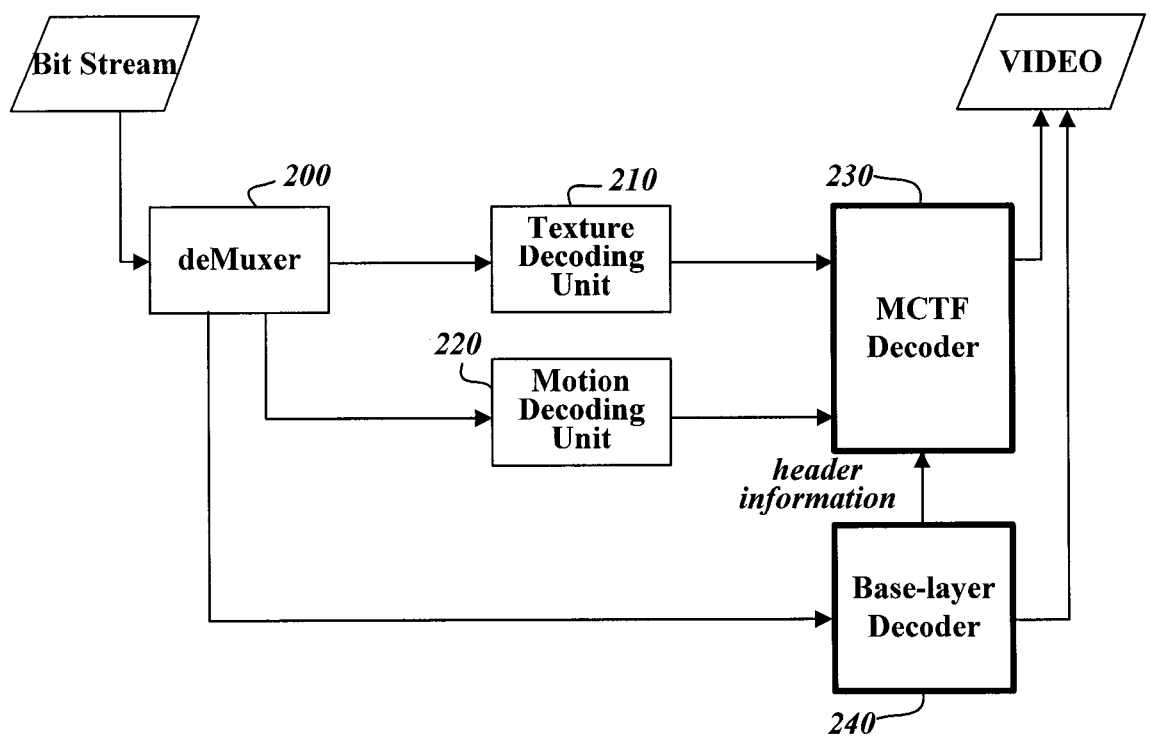
FIG. 8 is a block diagram of an apparatus for decoding a data stream encoded by the apparatus of FIG. 2.

FIG. 8 is a block diagram of an apparatus for decoding a data stream encoded by the apparatus of FIG. 2. The decoding apparatus of FIG. 8 includes a demultiplexer (demuxer) 200 for separating a compressed motion vector stream and a compressed macroblock information stream from a received data stream, a texture decoding unit 210 for reconstructing the compressed macroblock information stream into an original decompressed stream, a motion decoding unit 220 for reconstructing the compressed motion vector stream into an original decompressed stream, an MCTF decoder 230 for performing an inverse transform on the decompressed macroblock information stream and the decompressed motion vector stream using an MCTF method and obtaining an original video signal, and a base layer (BL) decoder 240 for decoding the base layer stream in a preset mode, for example, MPEG4 or H.264 mode. The BL decoder 240 provides header information contained in the base layer stream to the MCTF decoder 230 while decoding the input base layer stream, thus allowing the MCTF decoder 230 to use required encoding information of the base layer, for example, information about motion vectors.

The MCTF decoder 230 includes an inverse filter for reconstructing an original frame sequence from the input stream as an internal component.

Figure 9:
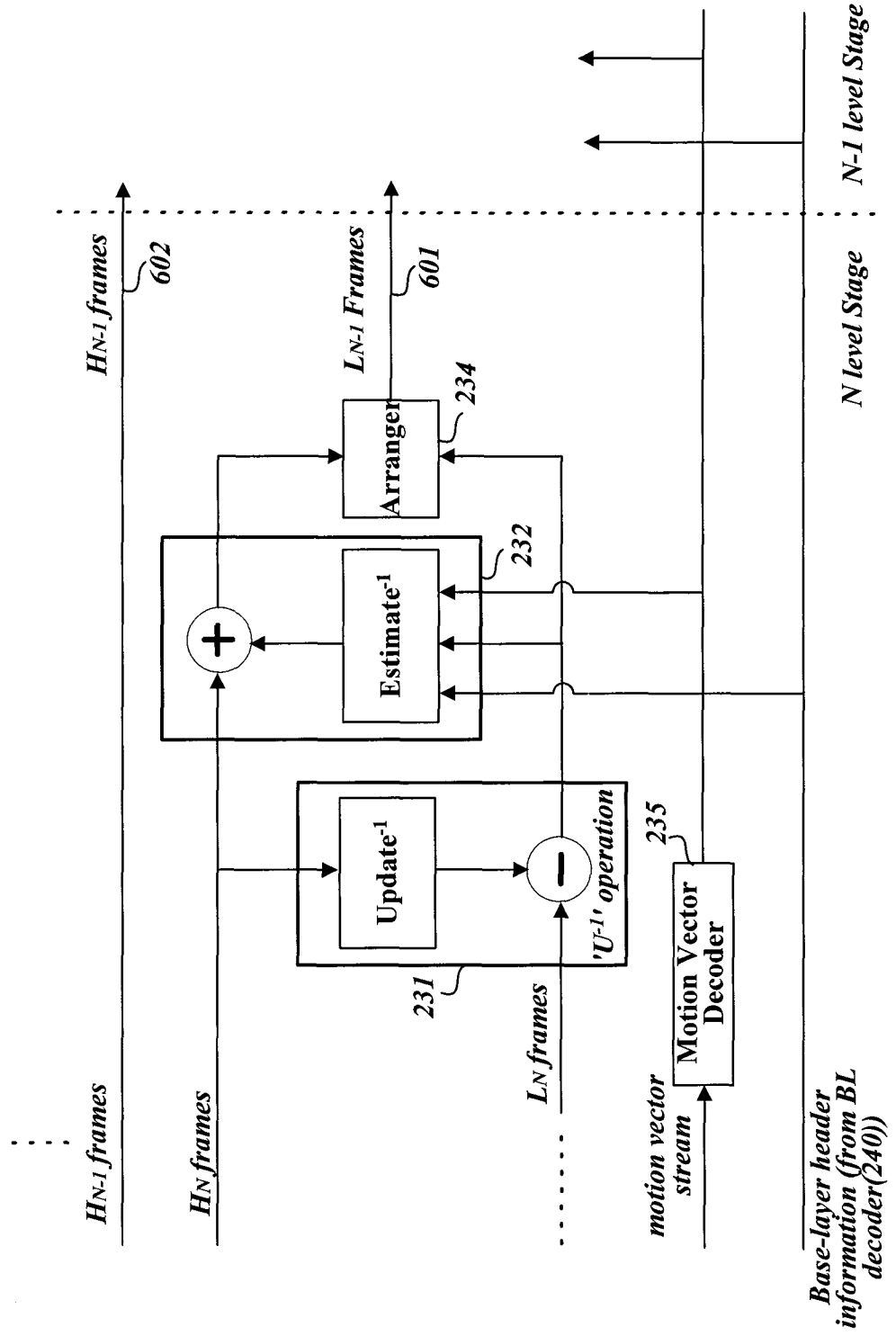
FIG. 9 is a diagram showing partial construction of an inverse filter for performing inverse prediction and inverse update operations in the MCTF decoder of FIG. 8.

FIG. 9 is a diagram showing partial construction of the inverse filter, in which an H and L frame sequence at an MCTF level N is reconstructed into an L frame sequence at an MCTF level N-1. In FIG. 9, the inverse filter includes an inverse update unit 231 for subtracting a difference value of an input H frame from an input L frame, an inverse prediction unit 232 for reconstructing an L frame having an original image using the L frame, from which the image difference of the H frame is subtracted, and the H frame, a motion vector decoder 235 for decoding an input motion vector stream and providing motion vector information of each macroblock within the H frame to the inverse prediction unit 232 in each stage, and an arranger 234 for interpolating the L frame completed by the inverse prediction unit 232 between the L frames output from the inverse update unit 231, thus generating a sequence of L frames that are arranged in a normal sequence.

The L frames output from the arranger 234 become an L frame sequence 601 at a level N-1. The L frame sequence 601 together with an H frame sequence 602 at a level N-1 is reconstructed again as an L frame sequence by both an inverse update unit and an inverse prediction unit in a subsequent stage. This procedure is performed a number of times that corresponds to the number of MCTF levels required for encoding, so that the original video frame sequence is reconstructed.

A procedure of reconstructing the H frame into the L frame at level N is described in detail in relation to the present invention. First, the inverse update unit 231 performs, with respect to an arbitrary L frame, an operation of subtracting error values of macroblocks in all H frames, of which image differences are obtained referring to blocks in the arbitrary L frame as a reference block, from a corresponding block of the arbitrary L frame.

Further, the inverse prediction unit 232 checks information about the motion vector of a macroblock within an arbitrary H frame. If the information indicates that the motion vector is identical to the derived vector of the corresponding block of the base layer, the inverse prediction unit 232 derives an actual vector (mv=mv') by applying a motion vector of a corresponding block within a predictive video frame, among the two frames of the base layer temporally adjacent to the current H frame and provided by the BL decoder 240, for example, the H frame, to the above Equations (1a) and (1b) or Equations (2a) and (2b). If the information about the motion vector indicates that a difference vector between the motion vector and the derived vector is coded, the vector mv' derived from Equations (1a) and (1b), Equations (2a) and (2b), or Equation (3a) or (3b) is added to the difference vector mv−mv' of the macroblock provided by the motion vector decoder 235, so that a pair of actual motion vectors or a single actual motion vector mv is obtained.

If the mode of the current macroblock is a BL Pred 1 or BL Pred 2 mode, the inverse prediction unit 232 derives a single motion vector from Equation (3a) or (3b), or derives a pair of motion vectors from Equations (4a) and (4b) or Equations (5a) and (5b). If the information about the motion vector of the current macroblock includes difference vector information, the derived vector is added to the difference vector corresponding to the derived vector, so that a single motion vector or a pair of motion vectors, used by the encoder during encoding, are obtained.

A reference block, included in the L frame, of the macroblock is detected with reference to the actual vector, which is derived and obtained from the motion vector of the base layer, or an actual motion vector, which is directly coded. Then, the pixel value of the reference block is added to difference values in the macroblock, thus the original image is reconstructed. If the above operations are performed on all macroblocks for the current H frame, and L frames are reconstructed, the L frames are alternately arranged together with the L frames updated by the update unit 231, through the arranger 234, and then output to a subsequent stage.

According to the above method, a data stream encoded using an MCTF method is reconstructed as a frame sequence of a complete image. In particular, when estimation/prediction and update operations in the above-described MCTF encoding are performed P times on a single GOP, image quality corresponding to that of the original video signal can be obtained if the inverse prediction and inverse update operations are performed P times to obtain a video frame sequence. In contrast, if the operations are performed a number of times less than P, image quality may be slightly deteriorated, but a video frame sequence having a lower bit rate can be obtained. Therefore, the decoding apparatus is designed to perform inverse prediction and inverse update operations in a degree suitable to the desired performance thereof.

The above-described decoding apparatus can be mounted in a mobile communication terminal or a device for reproducing a recording medium.

In MCTF encoding, a motion vector of a base layer, provided for a low-efficiency decoder, is used for the coding of a motion vector of a macroblock of an enhanced layer, thus eliminating correlation between the motion vectors of temporally adjacent frames. Accordingly, the amount of coding of the motion vector is reduced, so that the coding rate of MCTF is improved.

Those skilled in the art will appreciate that the present invention is not limited to the typical preferred embodiments, but various improvements, modifications, additions and substitutions are possible, without departing from the gist of the invention. If the implementation of these improvements, modifications, additions and substitutions belongs to the scope of the accompanying claims, the technical spirit thereof should be considered to belong to the present invention.

The invention claimed is:

1. A method of encoding a video signal, comprising:
obtaining, by an encoder, a motion vector of a predictive block in a predictive frame;
obtaining, by the encoder, a derived vector of an image block of a current frame;

generating, by the encoder, a bitstream of a first layer and a bitstream of a second layer, the first layer including a current frame, the second layer including the predictive frame, and the bitstream of the first layer including information regarding the derived vector;

wherein the obtaining a derived vector includes,
determining, by the encoder, a predictive frame temporally closest to a current frame and a reference frame of the predictive frame, the predictive frame and the reference frame being in the bit stream of the second layer, wherein a temporal position of the current frame is different from the predictive frame and the reference frame,
determining, by the encoder, a first temporal difference value between the current frame and the predictive frame,
determining, by the encoder, a second temporal difference value between the current frame and reference frame,
determining, by the encoder, at least one derived vector based on the motion vector, the first temporal difference value and the second temporal difference value, the derived vector being usable as a motion vector of an image block in the first layer.

2. The method of claim 1, further comprising:
determining a resolution ratio of the current frame and the predictive frame,
wherein the determining at least one derived vector determines the at least one derived vector using the resolution ratio.

3. The method of claim 2, wherein the determining at least one derived vector includes multiplying the resolution ratio, the motion vector of the predictive block in the predictive frame, and a temporal difference ratio, the temporal difference ratio being a ratio between a sum of the first and second temporal difference values, and one of the first and second temporal difference values.

4. The method of claim 1, wherein the information regarding the derived vector is a difference value of the derived vector and an actual motion vector which is obtained using the image block of the current frame and a reference block of the image block.

5. A decoding apparatus of decoding a video signal, comprising:
a demuxer configured to receive a bitstream of a first layer and a bitstream of a second layer;
a first decoder configured to extract a motion vector of a predictive block in a predictive frame, the predictive frame being in the second layer;
a second decoder configured to,
extract information regarding a derived vector of an image block of a current frame in the first layer, and
decode the image block of the current frame using the motion vector and the information regarding the derived vector,
wherein the second decoder obtains the derived vector by being further configured to,
determine the predictive frame temporally closest to the current frame and a reference frame of the predictive frame, the reference frame being in the second layer, wherein a temporal position of the current frame is different from the predictive frame and the reference frame,
determine a first temporal difference value between the current frame and the predictive frame,
determine a second temporal difference value between the current frame and reference frame,
determine at least one derived vector based on the motion vector, the first temporal difference value and the second temporal difference value, the derived vector being usable as a motion vector of the image block.

6. The decoding apparatus of claim 5, wherein a resolution ratio of the current frame and the predictive frame is determined, and the at least one derived vector is determined using the resolution ratio.

7. The decoding apparatus of claim 6, wherein the at least one derived vector is determined by multiplying the resolution ratio, the motion vector of the predictive block in the predictive frame, and a temporal difference ratio, the temporal difference ratio being a ratio between a sum of the first and second temporal difference values, and one of the first and second temporal difference values.

8. The decoding apparatus of claim 5, wherein the information regarding the derived vector is a difference value of the derived vector and an actual motion vector which is obtained using the image block of the current frame and a reference block of the image block.

9. A method of decoding a video signal, comprising:
receiving, at a decoder, a bitstream of a first layer and a bitstream of a second layer;
extracting, at the decoder, a motion vector of a predictive block in a predictive frame, the predictive frame being in the second layer;
extracting, at the decoder, information regarding a derived vector of an image block of a current frame in the first layer;
decoding, at the decoder, the image block of the current frame using the motion vector and the information regarding the derived vector,
wherein the derived vector is obtained by,
determining, at the decoder, the predictive frame temporally closest to the current frame and a reference frame of the predictive frame, the reference frame being in the second layer, wherein a temporal position of the current frame is different from the predictive frame and the reference frame,
determining, at the decoder, a first temporal difference value between the current frame and the predictive frame, and a second temporal difference value between the current frame and reference frame,
determining, at the decoder, at least one derived vector based on the motion vector, the first temporal difference value and the second temporal difference value, the derived vector being usable as a motion vector of the image block.

10. The method of claim 9, further comprising:
determining a resolution ratio of the current frame and the predictive frame,
the at least one derived vector is determined using the resolution ratio.

11. The method of claim 10, wherein the determining at least one derived vector includes multiplying the resolution ratio, the motion vector of the predictive block in the predictive frame, and a temporal difference ratio, the temporal difference ratio being a ratio between sum of the first and second temporal difference values, and one of the first and second temporal difference values.

12. The method of claim 9, wherein the information regarding the derived vector is a difference value of the derived vector and an actual motion vector which is obtained using the image block of the current frame and a reference block of the image block,
wherein the image block of the current frame is decoded by using the difference value and the derived vector.

13. The method of claim 9, wherein information regarding the motion vector of the predictive block is in a predictive block header.

* * * * *